United States Patent [19]

Irvin et al.

[11] Patent Number: 4,985,269
[45] Date of Patent: Jan. 15, 1991

[54] CONTINUOUS EXTRUSION FOR TORTILLA CHIP PRODUCTION

[75] Inventors: Scot A. Irvin, Baldwinsville; Robert A. Fedor, Fayetteville; Carleton G. Merritt, Phoenix, all of N.Y.

[73] Assignee: Borden, Inc., Columbus, Ohio

[21] Appl. No.: 536,727

[22] Filed: Jun. 12, 1990

[51] Int. Cl.$^5$ .............................. A23L 1/00; A23P 1/00
[52] U.S. Cl. ..................................... 426/560; 426/439; 426/448; 426/516; 426/626; 426/808
[58] Field of Search ............... 426/560, 448, 449, 458, 426/462, 464, 516, 549, 439, 626, 808

[56] References Cited

U.S. PATENT DOCUMENTS

| | | | |
|---|---|---|---|
| 2,584,893 | 2/1952 | Lloyd et al. | 426/622 |
| 3,020,162 | 2/1962 | Cunningham et al. | 426/439 |
| 3,083,103 | 3/1963 | Anderson et al. | 426/549 |
| 3,278,311 | 5/1966 | Brown et al. | 426/439 |
| 3,458,321 | 7/1969 | Reinhart et al. | 426/448 |
| 4,126,706 | 8/1978 | Hilton | 426/516 |
| 4,500,558 | 2/1985 | Fulger et al. | 426/516 |
| 4,645,679 | 12/1987 | Lee et al. | 426/560 |
| 4,748,037 | 5/1987 | Matsumoto et al. | 426/448 |
| 4,756,921 | 7/1988 | Calandro et al. | 426/560 |
| 4,769,251 | 9/1988 | Wenger et al. | 426/448 |
| 4,769,253 | 9/1988 | Willard | 426/808 |
| 4,778,690 | 10/1988 | Sadel et al. | 426/560 |
| 4,790,996 | 12/1988 | Roush et al. | 426/516 |
| 4,803,091 | 2/1989 | Mottur et al. | 426/439 |
| 4,834,996 | 5/1989 | Fazzolare et al. | 426/560 |

OTHER PUBLICATIONS

Japanese patent application 59-178407 of Aug. 29, 1984.
"Process Comparison Mapa Tortilla Chip vs. Traditional Masa Tortilla Chips" of 21 Feb. 1989, of MAPA.

Primary Examiner—George Yeung
Attorney, Agent, or Firm—Kenneth P. Van Wyck; Dennis H. Rainear; George P. Maskas

[57] ABSTRACT

The present invention provides a rapid and continuous process for making corn dough masa and tortilla chips by processing non-hydrated corn feed, an alkalizing agent, and water through a cooker-extruder under certain process parameters so as to make the masa and subsequently the finished tortilla product. The corn feed can be any form of corn ranging from whole kernel corn to finely ground corn flour. The extruder process conditions use a Specific Mechanical Energy input of 300 to 550 watt hours per kilogram of material fed to the extruder; a Residence Time Distribution of from about 175 to 400 seconds; a Shear Rate of 65 to 140 reciprocal seconds; and a Peak Temperature of 230° F. to 270° F.

34 Claims, 1 Drawing Sheet

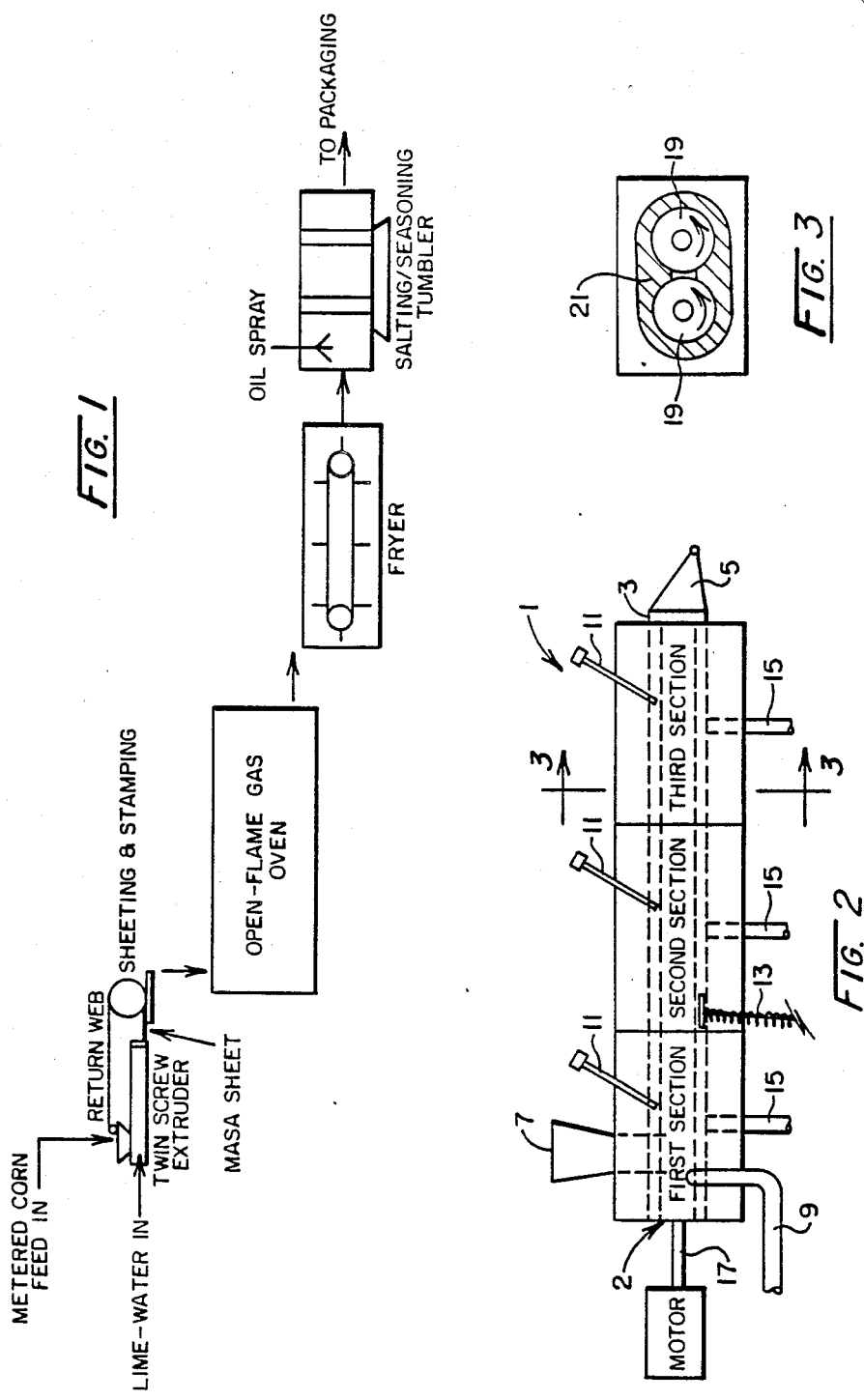

CONTINUOUS EXTRUSION FOR TORTILLA CHIP PRODUCTION

FIELD OF THE INVENTION

This invention relates to a rapid and continuous process for preparing tortilla chips by first making a masa in a cooker-extruder from non-hydrated corn feed, water, and an alkalizing agent by operation of the extruder under certain process conditions, and, on a continuous basis performing the remaining steps for production of tortilla chips such as sheeting the masa, cutting out small shaped and sized pieces from the sheet, and eventually frying the shaped pieces. The extruder process conditions involve: a Specific Mechanical Energy Input of 300 to 550 watt hours per kilogram of material fed to the extruder; a Residence Time Distribution of from about 175 to 400 seconds; a Shear Rate 65 to 140 reciprocal seconds; and a Peak Temperature of 230° F. to 270° F. The corn feed can be any form of corn such as whole kernel corn, cracked corn, flakes of corn, corn flour, and the like.

BACKGROUND OF THE INVENTION

Traditional corn chip processing includes the batch cooking and soaking in water of whole kernel corn with the addition of calcium hydroxide (lime) in a process that takes 8 to 12 hours. The cooking and soaking or steeping in water softens and hydrates the corn. The cooked and soaked materials is then washed to remove corn pericarp and drained of lime water; ground to produce masa; sheeted; cut into appropriate shapes, e.g., triangles, rounds, etc.; possibly proofed in a direct fire oven; and fried to a final moisture content. The process involves many time consuming and labor intensive steps, as well as producing an alkaline wasted water disposal problem.

More recently, Mapampianti (MAPA), an Italian equipment supplier, has developed an extrusion process which eliminates the husk removal and the alkaline waste water but still requires about six to eight hours of soaking time. Briefly, the MAPA tortilla process requires soaking of whole kernel corn in tap water to rehydrate the corn. The soaked corn is then transferred to a first single screw extruder for procesing with the original soak water. Excess water is returned to the soak tank and remixed with new water for soaking of the next batch. The corn is transferred to another extruder and eventually ground, cooked and sheeted. A substantially similar process is disclosed in U.S. Pat No. 4,778,690 of the Oct. 18, 1988 to MAPAM, INC., which appears to be a MAPA related company.

U.S. Pat. Nos. 4,834,996 of May 30, 1989 to Fazzolare et al and 4,645,679 of Feb. 24, 1987 to Lee et al disclose the manufacture of snack products from corn flour or comminuted corn wherein twin screw extruders are diclosed for some portion of the process.

U.S. Pat. No. 4,769,253 of Sept. 6, 1988 to Willard relates to a process for producing extruded fried snack products which have not been treated with lime from a variety of dry-milled corn ingredients.

U.S. Pat Nos. 3,278,311 of Oct. 11, 1966 to J.D. Brown et al; 4,803,091 of Feb. 7, 1989 to Mottur et al; and 3,020,162 Feb. 6, 1962 to Cunningham, Et Al show conventional methods for making corn chips.

U.S. Pat. No. 4,645,679 of Feb. 24, 1987 to Lee et al shows a generally conventional process for making a corn chip wherein a cooking extruder, preferably a twin screw extruder is used to enhance hydration and gelatinization of the starch.

U.S. Pat. No.4,748,037 of May 31, 1988 to Mastumoto et al as well as its initially filed Japanese patent application 59-178407 of Aug. 29, 1984 relates to a continuous method for preparing a soft snack food cake by extrusion cooking of whole or hulled beans or cereals such as corn in a twin screw extruder.

U.S. Pat Nos. 4,500,588 of Feb. 19, 1985 to Fulger; 3,458,321 July 26, 1969 to Reinhart et al; 4,756,921 of Jul. 12, 1988 to Calandro et al; and 4,790,996 of Dec. 13, 1988 to Roush et al disclosure the processing of various corn products on twin screw extruders.

SUMMARY OF THE INVENTION

The present invention relates to a continuous process for making corn masa dough suitable for deep fat frying. A continuation of the process produces tortilla chips from the masa. The process involves the use of a cooker extruder having a high shear rate, a short residence time, a peak temperature of about 230° F., to 270° F., and a Specific Mechanical Energy Input of about 300 to 550 watt hours per kilogram of material fed to the extruder. The invention also relates to corn dough and fried products possessing advantageous properties over the prior art.

The raw materials fed to the extruder are: non-hydrated corn feed; sufficient alkalizing agent to produce a masa having a pH of about 5.5 to 8.5, preferably 6 to 7; and a sufficient quantity of moisture which together with moisture in the corn and other ingredients fed to the extruder provides about 25% to 35% by weight of the feed materials. Preferably, the feed includes from about 0.1% to 0.6% by weight, based on the solids in the corn feed, of a nonionic emulsifier such as an ester of a polyol and a fatty acid having from about 12 to 20 carbon atoms. The corn dough, also referred to as masa, from the extruder can be further processed in a continuous manner as it leaves the extruder to provide fried products such as tortilla chips. A preferred cooker-extruder is a co-rotating twin screw cooker-extruder that provides high shear.

Advantages of this invention include the following: Elimination of the long soak time, batch cooking and wet grinding processes used in traditional tortilla chip manufacturing. Avoidance of wastewater with the inherent high alkalinity from the traditional lime treatment, even though an alkalizing agent such as lime is used in the process. Increases of the production yield due to no loss of pericarp. Allows for use of low grades of corn as well as all other forms of corn feed such as that ranging from whole kernel corn to finely ground corn flour. It can be a continuous process from the feeding of the raw materials through production of the final or finished tortilla chip or other fried product. It eliminates microbial problems associated with soaking-wet areas. It provides considerable time savings. It can produce fried products similar to that of the traditional tortilla chip process. The dough or masa from the extruder contains much less moisture than conventional masa used to make tortilla chips. Thus, the masa of this invention contains from about 25% to 35% by weight of moisture instead of about 50% by the traditional process. The reduced water content saves energy at the frying stage for making the tortilla chips and other fried products. Since the pericarp is a part of the masa, the product has a high fiber content. The finished or final tortilla chips produced by the process of this invention have a very low fat content while at the same time maintaining the good traditional masa flavor. The oil of fat content of the chip is from about 15% to 23% by weight (as determined by Foss-let) of the final tortilla chips, i.e., after deep frying and spraying of vegetable oil on the surface of the chips and the subsequent salting. The vegetable oil spray amounts to 3% to 5% of fat based on the weight of the final or finished chip.

BRIEF DESCRIPTION OF THE DRAWING

FIG. 1 is a process diagram of the present invention.

FIG. 2 is schematic side elevation of a twin screw extrusion apparatus which can be used in this invention.

FIG. 3 is a schematic view of the extruder barrel and twin screws taken along line 3—3 of FIG. 2.

DETAILED DESCRIPTION OF THE INVENTION

FIG. 1 is a process diagram of the present invention wherein the major pieces of equipment are named. As can be seen from FIG. 1, metered, corn feed is provided to the main feeder of an extruder. A co-rotating twin screw extruder is shown in the drawings. Also fed into the extruder, either through that main feeder or another opening near the main feeder, is calcium hydroxide or other alkalizing agent and water. The corn together with akalizing agent and additional moisture is cooked in the extruder and die formed to a sheet. The sheet is further sized with a set of rolls and cookie cut into pieces of an appropriate product shape and size for tortilla chips, such as triangles having 2.5 to 3 inch sides and a thickness of about 0.03 inches. A return web continuously carries scrap masa from the cutter back into the main extruder feed. The cut pieces are then optionally placed in an open flame gas oven for about 15 to 20 seconds at about 600° F. to 650° F. to remove surface moisture and help equilibrate the moisture content of the cut pieces. The cut pieces then, either from the stamping operation or the oven, are placed in a fryer maintained at conventional temperature for conventional periods of time such as a temperature of 325° F. to 410° F. for about 1 to 3 minutes so that the moisture content of the final product will be about 1% to 3% by weight. The fried pieces are then conveyed through an enclosed spray system where the vegetable oil is sprayed onto the surfaces of the pieces at a level of about 3% to 5% by weight of the finished product. The oiled pieces are then passed through a rotary tumbler where salt is applied by dusting the salt on the pieces such as at a level of about 1.25% to 2% by weight of the finished product. The salted product is then transported to the packaging area on conveyors. Final product cooling occurs at this time. By "finished product" or "final product" we mean the tortilla chip, or the other fried food or snack as sent to packaging.

FIG. 2 is a schematic side elevation view of a twin screw cooker-extruder apparatus which can be used in this invention. The apparatus 1 includes a twin screw extruder 2, a die mounting block 3, a die head 5 and a main feed or funnel 7 for receiving feeding ingredients and masa scrap after the sheet cutting operation. The alkalizing agent, added moisture and any additives such as emulisifiers can also be received through funnel 7. Preferably, the added moisture and alkalizing agent can be received into the extruder through conduit 9. The extruder apparatus has a first, second, and third section. Each of these sections is further divided into two parts, not shown. The first section is principally a blending section, the second, a cooking section, and the third a cooling section. The apparatus 1 also has means 11, 11, and 11 for measuring temperature in each section of the extruder barrel, an element 13 for heating the extruder barrel of the second section, and a cooling water inlet ports 15, 15, and 15 to each section if needed, although water is used for cooling in the third section. A motor driven shaft 17 which through gearing means not shown drives the extruder screws 19, 19 in the same direction (co-rotating) within extruder barrel 21 as more fully shown in FIG. 3.

FIG. 3 is a view taken along line 3—3 of FIG. 2 and shows a cross-section of extruder barrel 21 and co-rotating screws 19, 19.

The corn feed of this invention is non-hydrated. By the term "non-hydrated corn feed" we mean corn, whether whole kernel, cracked, flaked or in some other form, which has not been steeped in water or otherwise has its moisture content substantially increased. The non-hydrated corn feed will contain less than 20% by weight of moisture, generally less than about 16% of moisture.

The corn feed can be any form of corn such as whole kernel corn, cracked corn, flakes of corn, or flour. Preferably, the corn feed is non-hydrated whole kernel corn, cracked corn, flakes of corn, or ground corn having an average particle size wherein a minimum of 60% by weight of corn feed is retained on a U.S.S. 40 screen with not more than 40 % passing through a U.S.S. 40 screen. Cracked corn, as the name implies, is large pieces of corn such as half or quarter pieces of whole corn and mixtures or such pieces with whole corn.

The cooker-extruders used in this invention include single cooker-extruders as well as twin screw extruders. The twin screw extruders can have screws which are co-rotating or counter-rotating. The rotation of the screw or screws continuously convey the product from the inlet to the outlet while applying a mixing action as well as various amounts of shearing force to the mixture or dough. Heat is generated by the higher shearing forces, principally in the second or cooking section of the extruder. The extruder outlet is equipped with a die or shaped orifice for forming or shaping of the masa such as sheeting.

The extruders used in this invention have three main functional sections although each section can be further subdivided, generally into two subsections. The three main sections are: first, the mixing and blending section; second, the cooking section; and third, the cooling section. The first section contains a conveying screw or screws which mix the ingredients and form a dough while moving the dough to the second section. The first section exerts low shear and low compression forces on the ingredients. Generally, the channel width between the extruder screw or screws and barrel decreases as the ingredients are moved along in the first section and this creates some shear and compression of the dough and a low amount of heat. The dough is then conveyed by the screw or screws to the cooking section where some external heat is generally added, such as by thermostatically controlled induction heaters, e.g., numeral 13 in FIG. 2, although most of the heat is generated from the high shear of the screw or screws within the extruder barrel working against the dough. This section has the Peak Temperature, i.e., the highest temperature attained in the extruder. Such Peak Temperature can be from about 230° F. to 270° F., preferably from about 235° F. to 265° F., and particularly about 245° F. to 255° F. Most or practically all of the cooking and gelatinization of the dough takes place in this second section of the extruder which is one of intense mixing, shearing, and kneading. The dough is conveyed by the screw or screws from the second or cooking section to the third section where the dough is cooled prior to discharge from the extruder. The third section is one of low shear. The discharge from the extruder is generally through a die, such as a sheeting die. The temperature of the masa as it exits the third or cooling section is generally about 125° F. to 200° F. Cooling of the barrel in this section is generally accomplished by tap water circulating about the extruder barrel. The dough is cooled prior to discharge from the die so that it does not cause expansion or erratic discharge to the extent of being deleterious to the sheeting, cutting, and overall shape of the cut pieces. Thus, there is no significant expansion of the dough upon exit from the extruder. The Residence Time Distribution is from about 175 to 400 seconds, preferably 200 to 300 seconds. The Shear Rate is from about 65 to 140 $s^{-1}$ and preferably 70 to 130 $s^{-1}$ (reciprocal seconds) and the Specific Mechanical Energy Input is from about 300 to 550 watt hours per kilogram of material fed to the extruder.

Any grade of corn is suitable for use in this invention, such as U.S. No. 1 Food Grade whole kernel white or yellow corn. An advantage of this invention is that less expensive forms of corn feed such as cracked or whole kernel corn of a lower grade than conventionally used for making masa for tortilla production can be used. Illustratively, No. 2 grade corn of the Dent type as well as hybrid varieties can be used. The total moisture of the feed in the extruder is from about 25% to 35% by weight of the feed, including corn, with its inherent moisture, added water, lime or other alkalizing agent, and any additives such as emulsifiers. Generally, the commercially available corn feed will have a moisture content of less than about 16%. The water, alkalizing agent, and optionally small quantities of additional ingredients can be added together with the corn, such as through funnel 7 or through separate means in the first section, such as through conduit 9. The total raw material or ingredients placed in the extruder are the corn together with its inherent moisture, added water, alkalizing agent, and optionally small quantities such as less than about 2 or 3% of additional ingredients so as to affect the taste, texture, or appearance desired in final product. Preferably, in the making of masa for tortilla chips, the raw materials are limited to corn, water, calcium hydroxide, and up to about 0.5% by weight of the total feed of any added ingredients.

In order to inhibit or prevent expansion of the fried corn dough products of this invention, a nonionic emulsifier such as that having an HLB of about 3.2 to 5.0 in a quantity of about 0.1% to 0.6% by weight on the corn solids in the feed is added to the feedstock. Such emulsifiers have been used in the manufacture of fabricated potato chips but have not been necessary with traditional corn dough or masa. The emulsifier is preferably an ester of polyol and a long chain fatty acid such as that having from about 12 to 20 carbon atoms. Illustrative of polyols there can be mentioned those of glycerin, ethylene oxide, sorbitol, and glycols. The polyol will preferably have from 2 to 6 hydroxyl groups. Preferred emulsifiers are those of mono- and di-glycerides such as that of glycerol monostearate, glycerol distearate, glycerol dioleate, glycerol monopalmetate, and the like.

The amount of alkalizing agent used in this invention is sufficient to provide the extruded masa with a pH of about 5.5 to 8.5 and, about 6 to 7 so that the final tortilla product has the traditional taste. The alkalizing agent can be any alkaline non-toxic material which will impart the desired pH to the masa. Illustrative of alkalizing agents, there can be mentioned alkali metal and alkaline earth oxides and hydroxides such as sodium or potassium hydroxide, calicium oxide, and calcium hydroxide is preferred. About 0.05% to 0.3% and generally 0.1% to 0.2% by weight of calcium hydroxide based on the total weight of raw material ingredients is sufficient to provide the desired pH. Since the pH of the corn and added moisture can differ, samples of the ingredients having different quantities of the calcium hydroxide are made into masa and the pH determine in order to determine the exact amount of calcium hydroxide or lime to be used for attaining the desired pH.

The corn dough extrudate will generally have a moisture content of about 25% to 35% by weight of the corn dough, but generally from about 26% to 33%.

Preferred process conditions for operation of the extruder are as follows. The Peak Temperature is from 235° F. to 265° F. The Residence Time Distribution (RTD) is from about 200 to 300 seconds. RTD is a measure of the time the ingredients spend in the extruder. In this case, it is the time from when the corn feed is placed in the extruder barrel until the resulting masa is discharged from the extruder. The Specific Mechanical Energy Input (SME) is from about 300 to 550 Watt hours per kilogram. SME is a measure of the energy due to the shaft (screw) work in the extruder. The Time Temperature History (TTH) is $0.5 \times 10^{-11}$ to $15.0 \times 10^{-11}$ Kelvin-seconds. TTH is a measure of the physico-chemical reactions that affect flow properties. For the TTH calculations, we use a reaction activation energy of 27,000 calories per gram mole. The shear rate is 70 to 130 seconds$^{-1}$ (i.e., 70 to 130 reciprocal seconds). Shear Rate is the rate of the deformation of the dough is an average number for the entire extruder. A Strain History of 20,000 to 30,000. Strain History is a measure of the relative displacement of the dough as it is deformed. A Shear Stress of 70,000 to 90,000 Pascals. Shear Stress is pressure of force per unit area required to deform the dough (mixture) in the extruder. Again, this is an average number for the entire extruder. For the Shear Rate and Sheer Stress calculations, we use a consistency coefficient or consitency index m of 17,200 Pa-s$^n$ and a flow behavior index n of 0.34. An apparent Viscosity of 300 to 500 Pascal-seconds. Apparent Viscosity is a measure of the dough's (or mixtures) resistance to flow, and again this is an average measurement from one end of the extruder to the other. For the Apparent Viscosity calculations we use an activation energy of viscosity of 6,000 calories per gram mole. It should be noted that the calculations for the last four parameters assume that the dough (mixture) behaves like a power law fluid. The above parameters fairly fingerprint the processing involved in the cooker-extruder irrespective of the particular equipment. Thus, knowing these numbers, and what to do with them, should enable one skilled in the art to reproduce the results of this invention with any process and equipment which matches these parameters. In a preferred eembodiment of this invention, twin screw cooker-extruders are used, particularly co-rotating twin screw extruders having a length to diameter ratio of about 27 to 29 and a rotation speed for the screws of about 225 275 rpm.

A discussion and meaning of various terms such as RTD, SME, etc., which are used herein, can be found in: Altmare, R.E. and Ghossi, P. "An Analysis of Residence Time Distribution Patterns In A Twin-Screw Extruder" 1986 Biotechnology Progress; Harper, J. 1981, Extrusion of Foods, Vol. I; Levine L. "Understanding Extruder Performance" 1988, Cereal Foods World; Mackey, K.L., Morgan, R.G., and Steffe, J.F. "A Generalized Viscocity Model For Extrusion Of Starch Doughs" Paper at Winter Meeting, 1986, A.S-.A.E.; Mohamed, O.I.and Ofoli, R.Y., "Average Heat Transfer Coefficients in Twin Screw Extruders " 1989, Biotechnology Progress; Morgan, R.G., Steffe, J.F., and Ofoli, R.Y. "A Generalized Viscosity Model For Extrusion Of Protein Doughs" 1989, Journal Of Food Engineering; and Mercier, C., Linko, P., Harper, J.M. et al "Extrusion Cooking" 1989, A.A.C.C.

The following examples illustrate the present invention. All parts, percentages, and ratios in the examples and throughout this application are by weight, and all temperatures are in degrees F unless indicated to the contrary.

EXAMPLES 1 AND 2

Examples 1 and 2 involve the use of non-hydrated cracked corn continuous production of tortilla chips according to this invention. The inherent moisture content of the cracked corn of Example 1 was 14% by weight based on the weight of corn. Thus, the corn solids was 86%. The moisture content of the cracked corn of Example 2 was 13% by weight based on the weight of corn. The amount of calcium hydroxide on the weight of solids in the cracked corn in Example 1 was 0.45%, and for Example 2 it was 0.3%. Water was added so that the total moisture content of the feed was 34% by weight of the total feed for Example 1 and 32% for Example 2. Glycerol monostearate in a quantity of 0.3% based on the weight of corn solids was also added to the feed. A blend of corn, water, glycerol monostearate, and calcium hydroxide was fed into the extruder, through a funnel, with a twin screw feeder. The moisture content of the extrudate in Example 1 was 32% by weight of the masa, and for Example 2 it was 30% by weight of the masa. The pH of the masa extrudate was 6.3 for Example 1 and 6.8 for Example 2. The cooker extruder used in these examples was a twin screw Clextral-45 Extruder having a length to diameter ratio of about 28. Table 1 shows additional conditions for manufacture of the masa in these examples.

TABLE 1

Conditions For Production of Masa Used to Make Tortilla Chips From Cracked Corn in Examples 1 and 2

| | screw speed rpm | motor amps | feed setting | thrust bearing pressure bars | die pressure bars | Barrel Temperatures[1] in °C. | | | | | |
|---|---|---|---|---|---|---|---|---|---|---|---|
| | | | | | | 1 | 2 | 3 | 4 | 5 | 6 |
| Ex. 1 | 250 | 17 | 10 | 34 | 29 | 16 | 106 | 122 | 107 | 10 | 9 |
| Ex. 2 | 250 | 20 | 10 | 31 | 28 | 17 | 107 | 122 | 127 | 11 | 9 |

| | F rate[2] g/min | die temp, °C. | extrudate temp, °C. | TTH K-s | SME W-h/kg | shear rate, s[-1] | strain history | shear stress, Pa | apparent viscosity, Pa-s |
|---|---|---|---|---|---|---|---|---|---|
| Ex. 1 | 232 | 42 | 63 | 4.16E-11 | 338 | 76 | 20600 | 75100 | 413 |
| Ex. 2 | 246 | 48 | 66 | 8.03E-11 | 387 | 85 | 22800 | 77800 | 349 |

[1]The three sections of the extruder barrel are each subdivided into two parts for a total of six.
[2]Feed rate of the corn in grams per minute.

EXAMPLES 3 AND 4

Examples 3 and 4 involve the use of non-hydrated whole kernel corn for continuous production of tortilla chips according to this invention. The inherent moisture content of the corn in Example 3 was 13% by weight based on the weight of the corn where as that of Example 4 was also 13%. Additional moisture (water) was added to the feed so that total moisture of the feed was at least 29%. The amount of calcium hydroxide based on the weight of whole kernel corn was 0.2% for Example 3 and 0.2% for Example 4. The moisture content of the extrudate in Example 3 was 29% and that of Example 4 was 31% by weight of the masa. The pH of the masa extrudate was 6.8 for Example 3 and 6.8 for Example 4. The equipment used in these examples was the same as for Example 1 and 2. Table 2 shows additional conditions for the manufacture of the masa in these examples. Table 3 shows the screw configuration of the extruder used in these examples with the whole kernel corn.

TABLE 2

Conditions For Production of Masa Used to Make Tortilla Chips From Whole Kernel Corn in Examples 3 and 4

| | screw speed rpm | motor amps | feed setting | injected water | thrust bearing pressure bars | die pressure bars | Barrel Temperatures[1] in °C. | | | | | | F rate[2] g/min | die temp, °C. | extrudate temp, °C. | SME W-h/kg |
|---|---|---|---|---|---|---|---|---|---|---|---|---|---|---|---|---|
| | | | | | | | 1 | 2 | 3 | 4 | 5 | 6 | | | | |
| Ex. 3 | 300 | 22 | 7 | 28[3] | 29 | 36 | 12 | 64 | 119 | 127 | 6 | 5 | 279 | 41 | 69 | 434 |
| Ex. 4 | 325 | 21 | 7 | 28[3] | 27 | 33 | 13 | 63 | 126 | 127 | 7 | 6 | 2792 | 44 | 78 | 424 |

[1]The three sections of the extruder barrel are each subdivided into two parts for a total of six.
[2]Feed rate of the corn in grams per minute.
[3]Injected water at 28 means 77 grams per minute.

TABLE 3

Screw Configuration For Continuous Twin-Screw Extrusion For Whole Corn Kernel Tortilla Chip Production of Examples 3 and 4 (Clextral BC-45 Extruder)

|  | Length | Manuf. ID # | Type |
|---|---|---|---|
| I | 200 mm | 55663 | single flight, direct pitch |
|  | 50 | 42793 | (5) mixing discs |
|  | 50 | 41960 | single flight, direct pitch |
|  | 50 | 42793 | (5) mixing discs |
|  | 50 | 41960 | single flight, direct pitch |
|  | 50 | 62154 | (4) mixing blocks |
|  | 50 | 56397 | single flight, direct pitch |
| II | 50 | 62154 | (4) mixing blocks |
|  | 50 | 55664 | cut flight, reverse pitch |
|  | 100 | 56397 | single flight, direct pitch |
|  | 50 | 62154 | (4) mixing blocks |
|  | 50 | 510700 | cut flight, reverse pitch |
|  | 100 | 56397 | single flight, direct pitch |
|  | 50 | 42793 | (5) mixing discs |
|  | 50 | 625660 | cut flight, reverse pitch |
| subtotal | 800 mm |  |  |
|  | 200 | 62136 | twin flight, direct pitch |
| III | 100 | 62135 | twin flight, direct pitch |
|  | 200 | 62136 | twin flight, direct pitch |
| subtotal | 500 mm |  |  |
| TOTAL | 1500 mm |  |  |

What is claimed is:

1. A continuous process for making a corn masa dough suitable for deep fat frying which comprises the steps of:
   a. providing non-hydrated corn feed, water, and an alkalizing agent to a cooker-extruder, the quantity of alkalizing agent being sufficient to provide the resulting dough with a pH of about 5.5 to 8.5 and the quantity of water being sufficient to provide a total moisture content of about 25 to 35% by weight of the material provided to the extruder;
   b. mixing the water, alkalizing agent, and corn while subjecting said mixture to low shear forces to prepare a dough;
   c. providing external heat as well as heat from intense mixing, shearing, and kneading to cook said dough;
   d. cooling the dough and then expelling the dough from the extruder while the extruder operates with: a Residence Time Distribution of 175 to 400 seconds; a Specific Mechanical Energy Input of 300 to 550 watt hours per kilogram; a Shear Rate of 65 to 140 reciprocal seconds; and a Peak Temperature of 230 to 270 degrees F.

2. A method of claim 1 wherein the extruder is a twin screw extruder.

3. A continuous process for making corn masa dough suitable for deep fat frying which comprises the steps of:
   a. providing non-hydrated corn feed having an average size not finer than ground corn wherein at least 60% by weight of the corn is retained on a U.S.S. 40 screen and not more than 40% passes through a U.S.S. 40 screen, water and calcium hydroxide to a cooker-extruder, the quantity of calcium hydroxide being sufficient to provide the resulting dough with a pH of about 5.5 to 8.5 and the quantity of water being sufficient to provide a total moisture content of about 25% to 35% by the weight of the material provided to the extruder;
   b. mixing the water, calcium hydroxide, and corn while subjecting said mixture to low shear forces to prepare a dough;
   c. providing external heat as well as heat from intense mixing, shearing, and kneading to cook said dough;
   d. cooling the dough and then expelling the dough from the extruder while the extruder operates with: a Residence Time Distribution of 200 to 300 seconds; a Specific Mechanical Energy Input of 300 to 550 watt hours per kilogram; a Shear Rate of 70 to 130 reciprocal seconds; a Strain History of 20,000 to 30,000; a Shear Stress of 70,000 to 90,000 Pascals; and an Apparent Viscosity of 300 to 500 Pascals per second.

4. The process of claim 3 wherein: the pH of the dough is from about 6 to 7; the extruder has a Peak Temperature of about 235° F. to 265° F. and wherein the material fed to the extruder includes from about 0.1% to 0.5% based on corn solids of a noionic emulsifier to prevent or inhibit expansion of the dough on subsequent frying.

5. The process of claim 3 wherein the corn feed is whole kernel corn.

6. The process of claim 3 wherein the corn feed is cracked corn.

7. A process of claim 3 wherein the extruder is a twin screw extruder.

8. A process of claim 5 wherein the extruder is a co-rotating twin screw extruder.

9. The process of claim 3 wherein the dough exits the extruder at a temperature of about 125° F. to 200° F. without significant expansion of erratic discharge.

10. The process of claim 3 wherein the dough exits the extruder at a temperature of about 150° F. to 190° F.

11. The process of claim 10 wherein the dough exits the extruder at a temperature of about 165° F. to 185° F.

12. The process of claim 3 wherein the dough from the extruder is continuously sheeted and cut into pieces of predetermined size and shape.

13. The process of claim 12 wherein scrap from the dough sheet after cutting of pieces is continuously recirculated to the feed end of the extruder for reprocessing.

14. The process of claim 10 wherein the dough passes through a sheeting die as it exits the extruder, is further sized with a set of rolls, and cookie-cut to appropriate final product size and shape.

15. The process of claim 3 wherein the quantity of calcium hydroxide is from about 0.1% to 0.2% by weight of the ingredients fed into the extruder.

16. The process of claim 3 wherein the dough exiting from the extruder has a moisture content of about 26% to 33% by weight.

17. A continuous process for producing corn masa dough suitable for frying which comprises the steps of:
   a. providing a corn feed having less than about 16% moisture based on the weight of the corn is retained on a U.S.S. 40 screen with not more than 40% passing through a U.S.S. 40 screen, water, about 0.1% to 0.5% of a non-ionic emulsifier to prevent or inhibit expansion of the dough on frying, and calcium hydroxide to the feed end of a cooker extruder, the quantity of calcium hydroxide being sufficient to provide the resulting dough with a pH of about 5.5 to 8.5 and the quantity of water sufficient, together with moisture in the corn, to provide a total moisture content of about 25% to 35% by weight of the materials provided to the extruder, said extruder having a section for mixing of the feed ingredients to a dough, a subsequent section for cooking the dough and a further section for cooling of the dough and finally discharging the dough from the extruder;

b. maintaining within said extruder: a Residence Time Distribution of 200 to 300 seconds; a Specific Mechanical Energy Input of 300 to 550 Watt hours per kilogram; a Shear Rate of 70 to 130 reciprocal seconds; a Strain History of 20,000 to 30,000; a Shear Stress of 70,000 to 90,000 Pascals; and an Apparent Viscosity of 300 to 500 Pascal-seconds;

c. forming into pieces of predetermined size and shape the dough being discharged from the extruder; and d. frying the sized and shaped pieces.

18. The process of claim 15 wherein the extruder has a Peak Temperature of about 235° F. to 265° F. and the dough exists the extruder without significant expansion or erratic discharge at a temperature of about 125° F. to 200° F.

19. The process of claim 17 wherein the corn is whole kernel corn.

20. The process of claim 17 wherein the corn feed is ground corn having a minimum of 60% by the weight of the corn feed retained on a U.S.S. 40 screen and not more than 40% of the corn feed by weight passing through a U.S.S. 40 screen.

21. The process of claim 17 wherein the extruder is a twin-screw co-rotating extruder.

22. The process of claim 17 wherein the corn feed is whole kernel corn, the extruder is a twin-screw co-rotating extruder having a sheeting die, the sized and shaped pieces are passed through an oven to reduce surface moisture, then placed in a fryer to reduce moisture content of the pieces to 1 to 3%, sprayed with from about 3% to 5% of vegetable oil, salted and then packaged, each of said steps being performed continuously and wherein the said 1% to 3% moisture content and 3% to 5% of vegetable oil is based, by weight, of the finished product.

23. The process of claim 17 wherein the sized and shaped pieces are suitable in size and shape for making tortilla chips and such pieces after being fried, sprayed with vegetable oil and salted, having a total fat content of from about 15% to 23% by weight of the final tortilla chips.

24. The process of claim 17 wherein the pH is about 6 to 7.

25. A continuous process for making corn dough and subsequently tortilla chips having a fat content of from about 15% to 23% by weight of each chip which comprises the steps of:

a. feeding non-hydrated corn feed having an average size of not finer than ground corn wherein 60% by weight of the corn is retained on a U.S.S. 40 screen with not more than 40% passing through a U.S.S. 40 screen, a nonionic emulsifier in an amount sufficient to inhibit expansion of the corn dough on frying, water, and calcium hydroxide to a cooker extruder to make a corn dough, the quantity of calcium hydroxide being sufficient to provide the resulting dough with a pH about 5.5 to 8.5 and the quantity of water being sufficient to provide a total moisture of about 25% to 35% by weight of the feed material;

subjecting the feed to low shear forces sufficient to generate heat and forming a dough in the extruder;

c. working said dough in said extruder with screw mixing blocks and mixing disks and developing a temperature of from about 235° F. to 265° F. in the extruder barrel through work performed on the dough and by application of external heat in order to cook the dough;

d. and then cooling the cooked dough in the extruder and conveying it out of the extruder through a slotted die to form a sheet or ribbon, the dough having a temperature of about 150° F. to 190° F. and lacking any significant expansion after exiting the extruder; the Residence Time Distribution in said extruder being from about 175 to 400 seconds and the moisture content of said extruded dough being from about 26% to 33% by weight of said dough.

e. further sizing the sheet to reduce its thickness after the sheet exits from the extruder;

f. cutting the sized and sheeted dough to pieces of appropriate tortilla product shapes and sizes;

g. frying the pieces;

h. subjecting the fried pieces to a vegetable oil spray; and salting the oil sprayed tortilla pieces to produce finished tortilla chips, wherein the quantity of oil sprayed on said pieces if from about 3% to 5% of the finished chip and wherein the total fat content of said chips is from about 15% to 23% by weight of said finished chips and the frying being sufficient to provide a moisture content of from about 1% to 3% of said finished chips.

26. The process of claim 25 wherein masa scrap from the cutting operation is continuously recirculated and fed into the extruder.

27. The process of claim 25 wherein the extruder is a twin screw extruder.

28. A process of claim 27 wherein the twin screw extruder is a co-rotating twin screw extruder having a length to diameter ratio of about 27 to 29.

29. The process of claim 25 wherein the nonionic emulsifier is glycerol monostearate.

30. A corn dough masa having: a pH about 5.5 to 8.5; a moisture content of about 25% to 35%; 0.1 to 0.5% of a non-ionic emulsifier to prevent or inhibit expansion of said masa on subsequent frying, and substantially all of the pericarp of said corn, said masa prepared without steeping of the corn in water by providing to a cooker-extruder corn feed having an average size not finer than ground corn wherein at least 60% by weight of the corn is retained on a U.S.S. 40 screen with not more than 40% passing through a U.S.S. 40 screen, water in a quantity sufficient to provide a total moisture content of about 25% to 35% by weight of the material provided to the extruder, about 0.05% to 0.3% of the material provided to the extruder being calcium hydroxide and wherein the feed in said extruder has a Residence Time Distribution of 175 to 400 seconds, a Specific Mechanical Energy Input of 300 to 550 watt hours per kilogram of material fed to the extruder, a Peak Temperatur of 230 to 270 degrees F., and a Shear Rate of 65 to 140 reciprocal seconds.

31. The masa of claim 30 wherein the corn provided to the cooker-extruder is whole kernel corn.

32. The masa of claim 30 wherein corn provided to the cooker-extruder is ground corn wherein at least 60% by weight passes through a U.S.S. 40 screen with not more than 40% passing through a U.S.S. 40 screen.

33. The masa of claim 30 wherein the corn provided to the extruder is cracked corn.

34. A tortilla chip prepared by sheeting the masa of claim 30, cutting said sheet into predetermined tortilla sized pieces, frying the pieces, and then applying about 3% to 5% of vegetable oil and 1 to 2% of salt to the surface of the fried pieces to finish the pieces and wherein the finished pieces have a moisture content of 1% to 3% and a total fat content of 15% to 23%, said percentages being weight of the finished chip.

* * * * *

UNITED STATES PATENT AND TRADEMARK OFFICE
CERTIFICATE OF CORRECTION

PATENT NO. : 4,985,269

DATED : Jan 15, 1991

INVENTOR(S) : Scot A. Irvin; Robert A. Fedor; and Carleton G. Merritt

It is certified that error appears in the above-identified patent and that said Letters Patent is hereby corrected as shown below:

Column 10, lines 10 and 11:
  In the last two lines of claim 3, "Pascals per second" should read --Pascal-seconds --.

Column 11, line 14:
  In line 1 of claim 18 "15" should read --17 --.

Signed and Sealed this

Twenty-eighth Day of July, 1992

Attest:

DOUGLAS B. COMER

Attesting Officer     Acting Commissioner of Patents and Trademarks